United States Patent [19]

Moothart et al.

[11] Patent Number: 5,557,265
[45] Date of Patent: Sep. 17, 1996

[54] METHOD AND SYSTEM FOR INDICATING AN OPTICAL TRANSMIT AMPLIFIER FAULT

[75] Inventors: Michael R. Moothart, Garland; John M. Dugan, Richardson, both of Tex.

[73] Assignee: Alcatel Network Systems, Inc., Richardson, Tex.

[21] Appl. No.: 161,228

[22] Filed: Dec. 2, 1993

[51] Int. Cl.⁶ .................................................. G08B 21/00
[52] U.S. Cl. ................. 340/635; 359/110; 250/214 A; 250/214 LA; 250/227.21
[58] Field of Search ............................ 340/635; 359/110, 359/161, 341, 160; 370/13.1; 250/214 A, 214 LA, 227.21; 372/6

[56] References Cited

U.S. PATENT DOCUMENTS

| | | | |
|---|---|---|---|
| 4,257,033 | 3/1981 | Ota et al. | 359/110 |
| 4,994,675 | 2/1991 | Levin et al. | 359/110 |
| 5,150,243 | 9/1992 | Suzuki | 359/110 |
| 5,212,713 | 5/1993 | Frisch | 375/3.1 |
| 5,260,819 | 11/1993 | Hadjifotiou et al. | 359/110 |
| 5,267,068 | 11/1993 | Torihata | 359/110 |
| 5,335,104 | 8/1994 | Johnson | 359/110 |

*Primary Examiner*—Jeffery Hofsass
*Assistant Examiner*—Julie B. Lieu
*Attorney, Agent, or Firm*—Baker & Botts, L.L.P.

[57] ABSTRACT

Optical transmit amplifier (24) fault indicator system (46), (78), and (80) indicates the failure of optical transmit amplifier (24) and includes an input loss circuit (46), an output failure circuit (80), and a modulation detector circuit (78). The modulation detector circuit (78) receives a portion (76) of the optical output signal (74) for determining therefrom that a failure in modulation exists in optical output signal (74) of optical transmit amplifier (24). The modulation detector (78) includes a modulation conversion circuit (82) and (84) for converting modulation in the optical output signal (76) into a measurable signal having a level within a first predetermined range in the presence of modulation and a second predetermined range in the absence of modulation. The modulation detector circuit (78) converts the measurable signal to a DC signal and produces a loss of modulation alarm signal (114) in response to a loss of modulation.

10 Claims, 3 Drawing Sheets

METHOD AND SYSTEM FOR INDICATING AN OPTICAL TRANSMIT AMPLIFIER FAULT

TECHNICAL FIELD OF THE INVENTION

The present invention relates in general to the field of telecommunications systems and, more particularly, to a method and system for indicating an optical transmit amplifier fault.

BACKGROUND OF THE INVENTION

In the telecommunications industry, optical transmission devices permit communication of telecommunication signals over optical fibers. In order to increase the distance that an optical signal may travel, it is necessary to amplify the optical signal at selected points along its transmission path. A device that is becoming more prevalent in amplifying optical signals is known as an optical transmit amplifier. One type of optical transmit amplifier is known as an erbium-doped fiber amplifier (EDFA).

It is necessary to assure that the EDFA amplifies not only the power, but also the modulated optical signals that it receives. That is, an optical signal in which there is no modulated information can reach the EDFA. Also, modulated information in the signal can be lost during EDFA amplification. The EDFA, nevertheless, will amplify this optical signal. The output optical signal, however, will have no meaning or value, because it contains no modulated information. An average power detector will indicate an output signal from the EDFA. However, such a detector cannot determine that the output contains modulated information.

There is a need, consequently, for a method and system that detects the proper operation of an optical transmit amplifier such as an EDFA. Such a method and system is needed that detects not only the presence of an optical output signal, but also that modulation exists in the signal.

There is a further need for a method and system for indicating an optical transmit amplifier fault in the event of either or both a loss of modulation and a loss of optical signal power.

SUMMARY OF THE INVENTION

The present invention, accordingly, provides a method and system for indicating an optical transmit amplifier fault in a telecommunications system that substantially eliminates or reduces disadvantages and problems associated with previously developed optical transmit amplifier fault indicator methods and systems.

According to one aspect of the invention, there is provided an optical transmit amplifier fault indicator system that indicates the failure of an optical transmit amplifier and that includes an input loss circuit for receiving a portion of an optical input signal that goes to the optical transmit amplifier and that indicates that the level of the optical input signal falls below a predetermined optical input signal level. The indicator system also includes an output failure circuit for receiving a portion of an optical output signal from the optical transmit amplifier for determining that the level of the optical output signal falls below a predetermined output signal level. The indicator system further includes a modulation detector circuit that also receives a portion of the optical output signal for determining that a failure in modulation exists in the optical output signal.

The modulation detector includes a modulation conversion circuit for converting modulation in the optical output signal into a measurable signal. The measurable signal has a level within a first predetermined range in the presence of modulation in the optical output signal. The level is within a second predetermined range in the absence of modulation. The optical transmit amplifier fault indicator system has application for EDFA systems and includes within the modulation conversion circuit a photodiode and 100 MHz bandwidth amplifier that generate the measurable signal. The detector circuit associates with the photodiode and 100 MHz amplifier for determining that the measurable signal level falls within the first predetermined range. The detector circuit includes a peak-to-peak detector and a variable gain DC amplifier for amplifying the measurable signal.

A technical advantage of the present invention is that it detects modulation failures in an optical transmit amplifier such as an EDFA. The system of the present invention adds a degree of protection not currently present in systems that monitor the performance of optical transmit amplifiers. According to the present invention, there is provided a method of determining the location of a failure in the optical transmission of an optical transmit amplifier. This also improves the effectiveness of monitoring the optical transmit amplifier performance.

Another technical advantage of the present invention is that it covers a broad range of modulation data rates. For example, in one embodiment data rates ranging from 155.52 Mb/s to 9.95 Gb/s are possible. Even within this range of operation, the present invention provides a simple circuit that a manufacturer may fabricate on a known circuit board such as a printed circuit board.

Yet a further technical advantage of the present invention is that it is transparent to varying data rates. Thus, as data rates change with information into the optical transmit amplifier, the present invention continues to monitor the modulation of the optical transmit amplifier.

BRIEF DESCRIPTION OF THE DRAWINGS

The above and other technical advantages of the present invention will become more readily understood when the invention is described in further detail below, reference being made to the accompanying drawings in which like reference numerals represent like parts throughout and in which.

DETAILED DESCRIPTION OF THE ILLUSTRATIVE EMBODIMENT

The following illustrative embodiment of the present invention appears in the FIGUREs wherein like numerals are used for like and corresponding parts of the various drawings.

Figure 1:
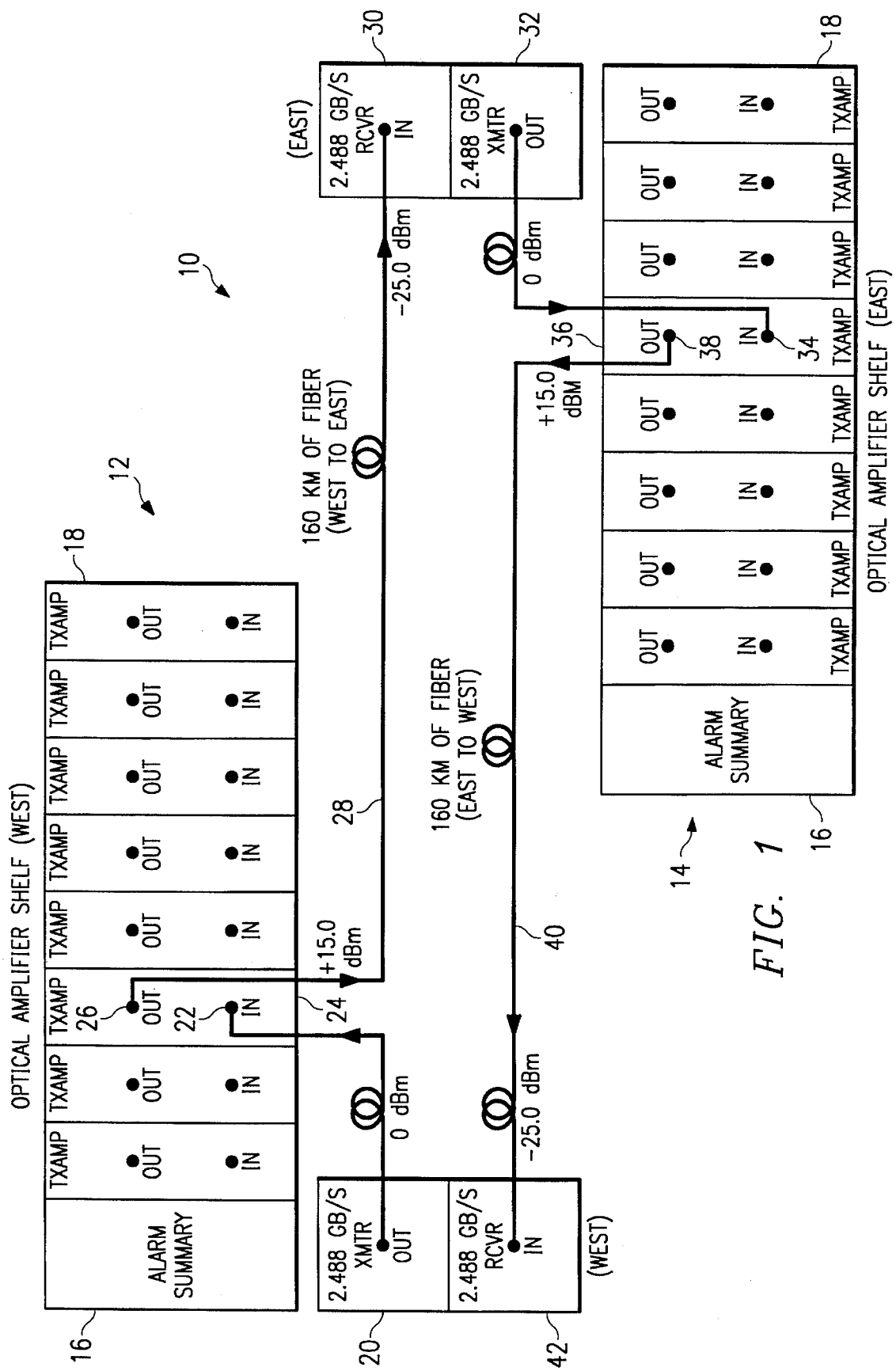
FIG. 1 provides an exemplary application of an optical transmit amplifier within an optical telecommunications network.

Referring to FIG. 1, there appears a typical application for an optical amplifier transmission system 10 wherein communications occur between optical amplifier shelf 12 and optical amplifier shelf 14. In each optical amplifier shelf 12 and 14, there is an alarm summary module 16 and a set of optical transmit amplifiers 18. Associated with each optical transmit amplifier 18 is an optical transmitter and receiver. As a particular example, in FIG. 1 transmitter circuit 20 provides a 2.488 Gb/s optical signal at 0 dBm to input 22 of transmit amplifier 24. Optical transmit amplifier 24 amplifies the optical signal and provides an optical output signal from output 26 that has a signal level of +15.0 dBm along fiber 28.

In the example of FIG. 1, fiber 28 has a length of 160 km. As a result of this distance, the signal that reaches receiver circuit 30 has a level of −25.0 dBm. In communicating from optical amplifier shelf 14, transmitter circuit 32 provides, for example, the 0 dBm 2.488 Gb/s signal to input 34 of transmit amplifier 36. From output 38, the optical signal travels along fiber 40 at an initial level of +15.0 dBm. The length of fiber 40 is 160 km, the distance of which reduces the level of optical output signal from optical amplifier shelf 14 to a level of −25.0 dB at the input of receiver circuit 42.

Figure 2:
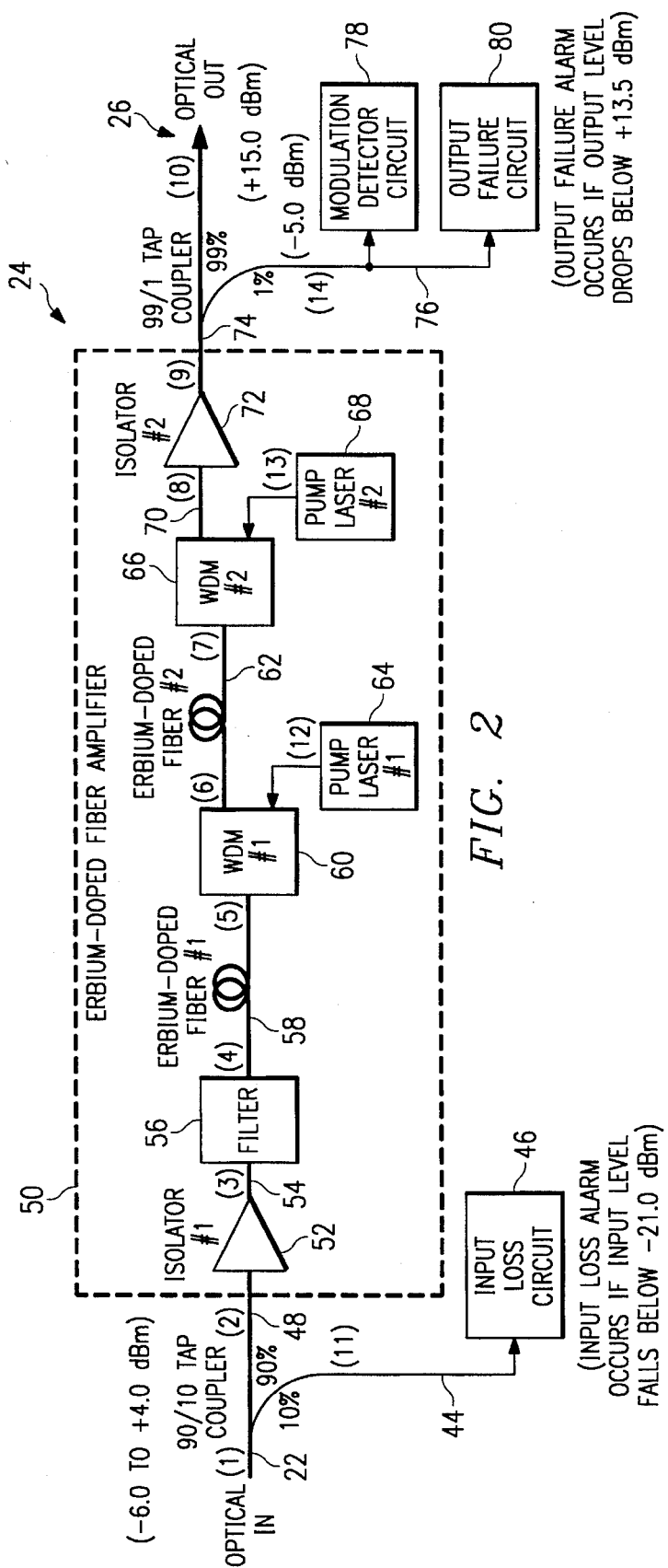
FIG. 2 is a block diagram of the present embodiment as applied to a typical optical transmit amplifier.

In FIG. 2 there appears a schematic block diagram of one embodiment of the present invention that provides fault indication for optical transmit amplifier 24. In particular, for a given optical transmit amplifier, optical input 22 at a normal wavelength of 1550 nm goes to transmit amplifier 24. In the embodiment of FIG. 2, optical input 22 splits so that 10% of optical input 22 goes along path 44 to input loss circuit 46. As FIG. 2 shows, input loss circuit 46 may be any circuit capable of detecting an input loss level falling below −21.0 dBm. The remaining 90% of optical input 22 at a normal wavelength of 1550 nm goes along path 48 to erbium-doped fiber amplifier (EDFA) 50 within optical transmit amplifier 24.

Within EDFA 50, isolator 52 transports the 1550 nm optical signal in one direction along input fiber 48 from the remaining EDFA 50 circuitry. From isolator 52, the optical signal travels along fiber 54 to filter 56. Filter 56 filters the optical signal and passes it to erbium-doped fiber 58. Pump laser 64 passes through wavelength division multiplexer (WDM) 60 and excites the ions of erbium-doped fiber 58, resulting in a predetermined amount of 1550 nm optical signal amplification. From erbium-doped fiber 58, the amplified optical signal passes through WDM 60 to erbium-doped fiber 62. Similarly, pump laser 68 passes through WDM 66 and excites the ions of erbium-doped fiber resulting in 1550 nm optical signal amplification. From erbium-doped fiber 62, WDM 66 receives the 1550 nm optical signal input and outputs amplified optical signal along path 70 to isolator 72. Isolator 72 provides output signal 74, 99% of which becomes transmit amplifier output 26 and 1% of which goes along tap 76 for modulation detector circuit 78 and output failure circuit 80 to measure. As FIG. 2 shows, output loss circuit 80 may be any circuit capable of detecting an output signal level dropping below +13.5 dBm.

Transmit amplifier 24 boosts the light of an external 1550 nm laser transmitter to an output level of +15.0 dBm. The gain amplification of transmit amplifier 28 occurs within EDFA 50 by virtue of the optical input signal passing through (a) two 1480 nm pump lasers 64 and 68, (b) two optical wave division multiplexers (WDMs) 60 and 66, (c) two optical isolators 52 and 72, optical filter 56 to block the 1480 nm optical signal, and several meters of erbium-doped fiber 58 and 62. U.S. Pat. No. 5,202,780 entitled "Optical Communication System for the Subscriber Area" by Fussanger, et al. and assigned to Alcatel N.V. of Amsterdam, Netherlands, describes in detail a suitable device for use as EDFA 50 and is herein incorporated by reference.

In FIG. 2, points within transmit amplifier 24 are labelled (1), (2), (3), (4), (5), (6), (7), (8), (9), (10), (11), (12), (121), and (14). TABLE 1, below, relates a failure in each of these locations within transmit amplifier 24= to a failure signal that the present embodiment provides. For example, if a failure occurs between points: (2) and (4), whether it be a component failure or a break in erbium-doped fiber 58, the optical output level remains constant at +15.0 dBm, while modulating the amplifier's spontaneous emission (ASE). Modulation detector circuit 78 discerns between the ASE and actual data transmission. Modulation detector circuit 78 produces, in response to the failure between points (2) and (4), an alarm to indicate loss of modulation. In the present embodiment, varying data rates do not affect modulation detector circuit 78 detection, even across the band of 155.52 Mb/s to 9.95 Gb/s.

TABLE 1

| Type of Failure | Resultant Indicator Alarm |
| --- | --- |
| Fiber break in location (1) | Loss of Input & Loss of Modulation |
| Fiber break in location (2) | Loss of Modulation |
| Fiber break in location (3) | Loss of Modulation |
| Fiber break in location (4) | Loss of Modulation |
| Fiber break in location (5) | Loss of Modulation & Output Fail |
| Fiber break in location (6) | Loss of Modulation & Output Fail |
| Fiber break in location (7) | Loss of Modulation & Output Fail |
| Fiber break in location (8) | Loss of Modulation & Output Fail |
| Fiber break in location (9) | Loss of Modulation & Output Fail |
| Fiber break in location (10) | No Alarm |
| Fiber break in location (11) | Loss of Input |
| Fiber break in location (12) | Possible Loss of Modulation & Output Fail |
| Fiber break in location (13) | Possible Loss of Modulation & Output Fail |
| Fiber break in location (14) | Loss of Modulation & Output Fail |
| Pump lasers (64 and 68) | Pump Laser Fail |

Figure 3:
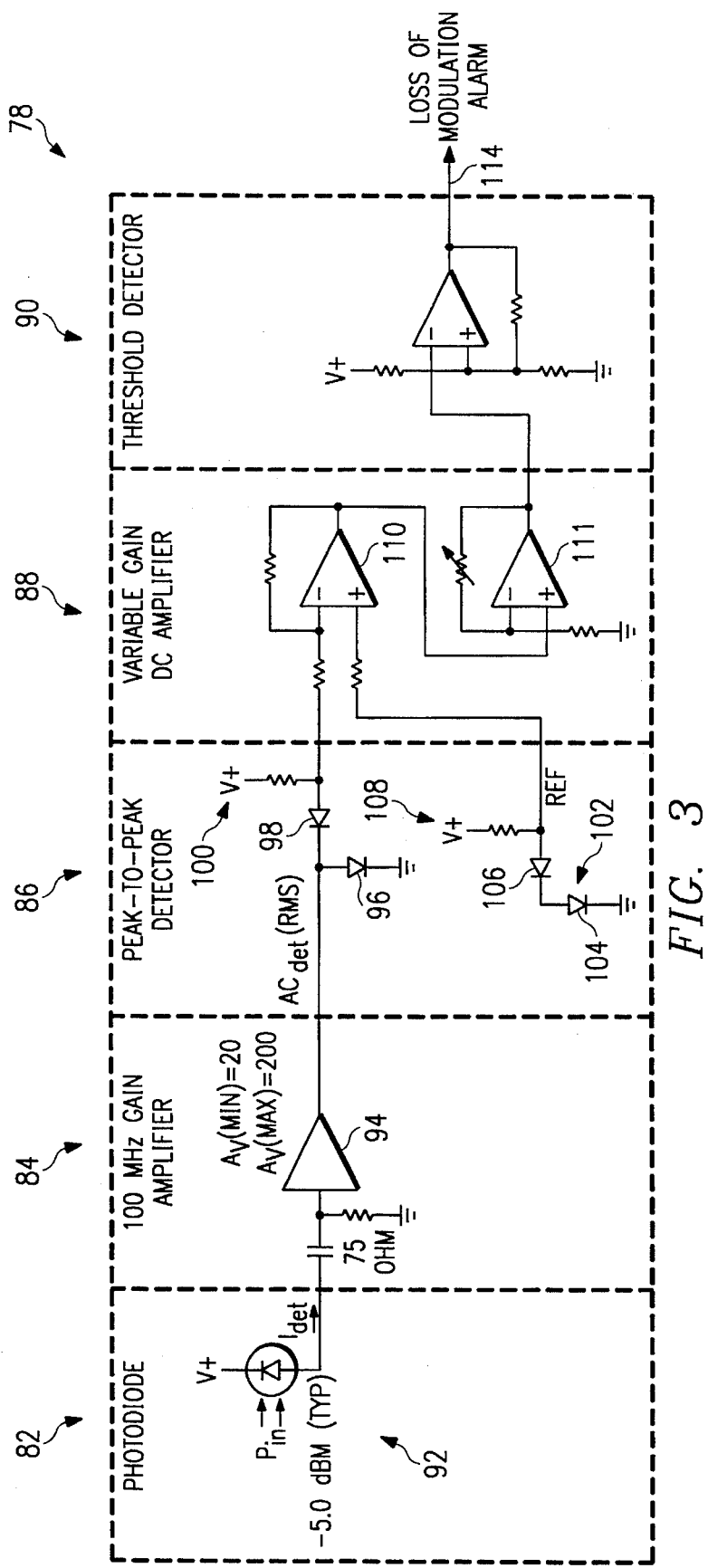
FIG. 3 illustrates, using a block diagram, one embodiment of the modulation detector that the present embodiment uses.

FIG. 3 shows a block diagram of modulation detector 78 according to one aspect of the present embodiment. In FIG. 3, modulation detector circuit 78 includes photodiode portion 82 that connects to 100 MHz bandwidth amplifier portion 84. From 100 MHz amplifier 84 portion, the amplified AC signal goes to peak-to-peak detector portion 86. Peak-to-peak detector portion 86 produces a DC signal that goes to variable gain DC amplifier portion 88. Threshold detector portion 90 takes the amplified DC signal from variable gain DC amplifier portion 88 to produce, if appropriate, a loss of modulation alarm signal.

In the operation of modulation detector circuit 78, as the output optical signal passes along optical fiber portion 76 (FIG. 2) it enters photodiode portion 82. Photodiode portion 82 and variable gain amplifier portion 84 accept the 1550 nm optical data stream that the optical signal carries and demodulates the signal to produce the AC detector signal that peak-to-peak detector portion 86 receives. The AC detect signal may be defined by the following expression:

$$AC_{Detect}(RMS) = 1.414(P_{in})(R)(R_{in})(A_v)[(BW_{P\&A})/(Data\ Rate)]^{1/2},$$

wherein, $AC_{Det}$(RMS)=RMS voltage level at the output of the 100 MHz electrical amplifier, $P_{in}$=Average optical input power (0.32 mW typical), R=Responsivity of photodiode (0.8 A/W typical), $R_{in}$=Input resistance of electrical amplifier (75 ohm typical), $A_v$=Amplifier Gain (10 V/V), $BW_{P\&A}$=Equivalent bandwidth frequency of photodiode and 100 MHz amplifier combination (100 MHz typical), and Data Rate=Bit rate of data transmission (155.52 Mb/s to 9.95 Gb/s range)

The AC voltage level is routed to peak-to-peak detector portion 86 that converts the AC signal to a proportional DC signal.

100 MHz amplifier portion 84 includes amplifier 94 which produces an amplified AC signal that goes to peak-to-peak detector portion 86. Peak-to-peak detector portion 86 includes diodes 96 and 98 that use voltage level 100 to produce a DC output to DC amplifier portion 88. In addition, peak-to-peak detector portion 86 includes reference circuit 102 that, likewise, has diodes 104 and 106. Together with voltage level 108 diodes 104 and 106 produce a reference voltage level into amplifier 110. Diodes 104 and 106 provide a temperature compensation reference for the input to DC amplifier 88.

DC amplifiers 110 and 111 amplify the differences between the detected DC signal and the reference DC signals to produce the $DC_{det}$ at line 112 that goes to threshold detector portion 90. Threshold detector portion 90 determines if the $DC_{det}$ is above or below the normal specified limits for intensity modulated optical data transmission. These limits include data rates that range from 622.08 Mb/s to 9.95 Gb/s, in the present embodiment. Depending on the level of the DC signal at line 112, threshold detector portion 190 produces a loss of modulation alarm signal at output 114. If the DC detected level at line 112 is above a predetermined threshold, no loss of modulation alarm occurs. On the other hand, if the DC detector level falls below the predetermined threshold, threshold detector portion 90 produces the loss of modulation alarm signal at line 114. In other words, signals above the predetermined threshold may be considered in a first predetermined range while those below the threshold may be considered in a second predetermined range of signals.

The present embodiment may be formed by a variety of known engineering techniques. Having described the structure and function of the embodiment, its manufacture may proceed through the use of established engineering principles. The manufacture of the present embodiment are, therefore, within the scope of the present invention.

Our technical advantage of the present embodiment is that it detects modulation failures of an optical transmit amplifier such as an EDFA. That is, the system of the present embodiment adds a degree of protection not currently present in systems that monitor the performance of optical transmit amplifiers. This improves the effectiveness of monitoring the optical transmit amplifier performance.

Another technical advantage of the present embodiment is that it can cover a broad range of modulation data rates. For example, data rates ranging from 155.52 Mb/s to 9.95 Gb/s are possible. Thus, as data rates change with information into the optical transmit amplifier, the present embodiment continues to monitor the modulation of the optical transmit amplifier. Even within this range of operation, the present embodiment provides a simple circuit that a manufacturer may fabricate on a known circuit board such as the printed circuit board.

OPERATION

Although operation of the present embodiment is clear from the above description, the following description of an illustrative embodiment appears for completeness. In normal operation, modulation detector circuit 78 converts data stream activity to the proportion DC level, $DC_{det}$. This DC voltage is above a set threshold which results in a "no alarm status." If a fiber break or component failure occurs between points (2) and (4), for example, modulation detector circuit 78 converts the ASE modulation to a proportional DC level. This DC level, however, is below the set threshold voltage of threshold detector circuit 90. This results in an alarm status indicating that although optical transmit amplifier 24 amplifies an optical input signal, the optical signal does not contain information but is, instead, a spontaneous emission from the amplifier. The alarm condition results because the DC level resulting from modulated ASE is at least a factor of 10 below the DC level resulting from the modulated 9.95 Gb/s data stream.

In summary, the present embodiment provides an optical transmit amplifier fault indicator system that indicates the failure of an optical transmit amplifier and that includes an input loss circuit for receiving a portion of an optical input signal to the optical transmit amplifier and that indicates therefrom that the level of the optical input signal falls below a predetermined optical input signal level. The indicator system also includes an output failure circuit for receiving a portion of an optical output signal from the optical transmit amplifier for determining that the level of the optical output signal falls below a predetermined output signal level. The indicator system further includes a modulation detector circuit that even further receives a portion of the optical output signal for determining therefrom that a failure and modulation exists in the optical output signal.

The modulation detector includes a modulation conversion circuit for converting modulation in the optical output signal into a measurable signal. The measurable signal has a level within a first predetermined range in the presence of modulation in the optical output signal. The level is within a second predetermined range in the absence of modulation within the optical output signal. The optical transmit amplifier fault indicator system has application for erbium-doped fiber amplifiers and includes within the modulation conversion circuit a photodiode and 100 MHz amplifier that generate the measurable signal. The detector circuit associates with the photodiode and 100 MHz amplifier for determining that the measurable signal level falls with the first predetermined range. The detector circuit includes a peak-to-peak detector and a variable gain DC amplifier for amplifying the measurable signal.

Although the present invention has been described in detail, it should be understood that various changes, substitutions and alterations can be made hereto without departing from the spirit and scope of the invention as defined by the appended claims.

What is claimed is:

1. An optical transmit amplifier fault indicator system for indicating the failure of an optical transmit amplifier, said optical transmit amplifier fault indicator system having an input loss circuit for receiving a portion of an optical input signal to the optical transmit amplifier indicating therefrom that the level of said optical input signal falls below a predetermined optical input signal level for indicating a loss in the optical input signal to the optical transmit amplifier and having an output failure circuit for receiving a portion of an optical output signal from the optical transmit amplifier for determining that the level of said optical output signal falls below a predetermined output signal level for indicating a failure in the optical transmit amplifier output arising from a condition other than a loss in the optical input signal, said optical transmit amplifier fault indicator system comprising:

a modulation detector circuit for receiving a portion of said optical output signal and determining therefrom that a failure in modulation exists in said optical output signal of said optical transmit amplifier modulation;

said modulation detector circuit for converting modulation in said optical output signal into a measurable electrical signal, said measurable electrical signal having a level within a first predetermined range in the presence of modulation in said optical output signal and within a second predetermined range in the absence of modulation within said optical output signal;

said modulation detector circuit further for producing a loss of modulation alarm signal if said measurable electrical signal is within the second predetermined range; and wherein said modulation detector circuit comprises a photodiode portion and an amplifier portion for generating an amplified AC signal at a predetermined frequency bandwidth in response to modulation in said optical output signal.

2. The system of claim 1, wherein said modulation detector circuit further comprises a detector circuit portion associated with said photodiode portion and said amplifier portion for detecting the level of said amplified AC signal.

3. The system of claim 2, wherein said detector circuit portion comprises a peak-to-peak detector circuit for generating a DC signal in response to said amplified AC signal.

4. The system of claim 3, wherein said modulation detector circuit further comprises a variable gain DC amplifier portion for amplifying said DC signal.

5. A method for indicating the failure of an optical transmit amplifier using a fault indicator system having the ability first of all to receive a portion of an optical input signal in an input loss circuit to indicate from the portion of the optical input signal that the level of the optical input signal falls below a predetermined optical input signal level resulting in a loss of the optical input signal to the optical transmit amplifier and secondly to receive a portion of an optical output signal from the optical transmit amplifier in an output failure circuit to indicate that the level of optical output signal falls below a predetermined output signal level resulting in a failure in the optical transmit amplifier output arising from a condition other than a loss of the optical input signal, the method comprising the steps of:

receiving a portion of the optical output signal as an input to a modulation detector circuit;

producing a proportional AC signal in response to the portion of the optical output signal input to the modulation detector circuit using a photodiode circuit and further generating a measurable electrical signal from the proportional AC signal using an amplifier operating at a predetermined frequency bandwidth;

indicating from the measurable electrical signal that a failure in modulation exists in the optical output signal of the optical transmit amplifier by converting modulation in the optical output signal into a measurable electrical signal and determining that the measurable electrical signal has a level within a first predetermined range in the presence of modulation in the optical output signal and within a second predetermined range in the absence of modulation within the optical output signal; and indicating, by producing a loss of modulation alarm signal, that the optical output signal has no modulation as a result of the measurable electrical signal having a level within the second predetermined range.

6. The method of claim 5, further comprising the step of determining that the measurable electrical signal falls within the first predetermined range to determine the presence of modulation in the optical transmit amplifier output using a detector circuit comprising a peak-to-peak detector circuit for generating a measurable DC signal corresponding to the amplified AC signal.

7. A method for forming an optical transmit amplifier fault indicator system for indicating the failure of an optical transmit amplifier, the optical transmit amplifier fault indicator system having an input loss circuit for receiving a portion of an optical input signal to the optical transmit amplifier and indicating therefrom that the level of the optical input signal falls below a predetermined optical input signal level, and having an output failure circuit for receiving a portion of an optical output signal from the optical transmit amplifier for determining that the level of the optical output signal falls below a predetermined output signal level for indicating an output failure from the optical transmit amplifier, the method comprising the steps of:

forming a modulation detector circuit also for receiving a portion of the optical output signal for determining therefrom that a failure in modulation exists in the optical output signal of the optical transmit amplifier, said modulation detector circuit forming step further comprising the step of forming a modulation conversion circuit for converting modulation in the optical output signal into a measurable electrical signal, the measurable electrical signal having a level within the first predetermined range in the presence of modulation in the optical output signal and within the second predetermined range in the absence of modulation within the optical output signal;

said modulation detector circuit forming step further comprising the step of forming the modulation detector circuit to indicate, by producing a loss of modulation alarm signal, that the optical output signal has no modulation as a result of the measurable electrical signal having a level within the second predetermined range; and said modulation detector circuit forming step further comprising the steps of forming a photodiode portion and a 100 MHZ amplifier portion of the modulation conversion circuit for generating the measurable electrical signal representing the presence or absence of modulation.

8. The method of claim 7, further comprising the step of forming a detector portion within the modulation detection circuit and associated with the photodiode portion and the amplifier portion for operating at a predetermined frequency bandwidth and determining that the level of the measurable electrical signal falls within the first predetermined range to indicate the presence of modulation in the optical amplifier output signal.

9. The method of claim 8, further comprising the step of forming within the detector portion of the modulation detection circuit a peak-to-peak detector circuit.

10. The method of claim 8, further comprising the step of forming a variable gain DC amplifier circuit within the detector portion for amplifying the measurable electrical signal.

* * * * *